(12) United States Patent
Cougias et al.

(10) Patent No.: US 11,386,270 B2
(45) Date of Patent: Jul. 12, 2022

(54) AUTOMATICALLY IDENTIFYING MULTI-WORD EXPRESSIONS

(71) Applicant: Unified Compliance Framework (Network Frontiers), Las Vegas, NV (US)

(72) Inventors: Dorian J. Cougias, Las Vegas, NV (US); Steven Piliero, Burbank, CA (US); Dave Dare, Las Vegas, NV (US); Lucian Hontau, Vancouver, WA (US); Sean Kohler, Phoenix, AZ (US); Michael Wedderburn, Elk Grove, CA (US)

(73) Assignee: Unified Compliance Framework (Network Frontiers), Las Vegas, NV (US)

(*) Notice: Subject to any disclaimer, the term of this patent is extended or adjusted under 35 U.S.C. 154(b) by 0 days.

(21) Appl. No.: 17/460,054

(22) Filed: Aug. 27, 2021

(65) Prior Publication Data

US 2022/0067290 A1    Mar. 3, 2022

Related U.S. Application Data

(60) Provisional application No. 63/073,323, filed on Sep. 1, 2020, provisional application No. 63/071,180, filed on Aug. 27, 2020.

(51) Int. Cl.
*G06F 40/295* (2020.01)
*G06K 9/62* (2022.01)
(Continued)

(52) U.S. Cl.
CPC .......... *G06F 40/295* (2020.01); *G06F 40/242* (2020.01); *G06K 9/6256* (2013.01); *G06N 20/00* (2019.01)

(58) Field of Classification Search
CPC ... G06F 40/295; G06F 40/242; G06K 9/6256; G06N 20/00
(Continued)

(56) References Cited

U.S. PATENT DOCUMENTS 4,847,766 A    7/1989    McRae et al.
5,715,468 A    2/1998    Budzinski
(Continued)

FOREIGN PATENT DOCUMENTS

WO    2008121382    10/2008

OTHER PUBLICATIONS

"AuditScripts—About Us," <www.auditscripts.com/about-us/>, 2011. (2 Pages).
(Continued)

*Primary Examiner* — Edwin S Leland, III
(74) *Attorney, Agent, or Firm* — Seed IP Law Group LLP

(57) ABSTRACT

A facility for identifying multi-word expressions in a natural language sentence is described. The facility provides the sentence to each of multiple natural language processing modules including a first module, a second module, and a third module. Each natural language processing module uses a different approach to identify a multi-word expression and a type of the multi-word expression. Upon determining that the multiple identifiers of the multi-word expression differ, the facility determines the multi-word expression using a resolution process, which can involve a logical rule set or a machine learning model.

22 Claims, 12 Drawing Sheets

(51) Int. Cl.
*G06N 20/00* (2019.01)
*G06F 40/242* (2020.01)

(58) Field of Classification Search
USPC .......................................................... 704/9
See application file for complete search history.

(56) References Cited

U.S. PATENT DOCUMENTS

| | | | |
|---|---|---|---|
| 5,745,776 A | 4/1998 | Sheppard, II | |
| 5,819,265 A * | 10/1998 | Ravin | G06F 40/268 |
| 5,832,480 A * | 11/1998 | Byrd, Jr. | G06F 16/90344 |
| 6,289,342 B1 | 9/2001 | Lawrence et al. | |
| 6,393,389 B1 * | 5/2002 | Chanod | G06F 40/289 |
| | | | 704/7 |
| 6,453,315 B1 | 9/2002 | Weissman et al. | |
| 6,675,169 B1 | 1/2004 | Bennett et al. | |
| 6,738,780 B2 | 5/2004 | Lawrence et al. | |
| 6,823,325 B1 | 11/2004 | Davies | |
| 6,966,030 B2 | 11/2005 | Ashford et al. | |
| 7,333,927 B2 | 2/2008 | Lee et al. | |
| 7,493,253 B1 | 2/2009 | Ceusters | |
| 7,822,597 B2 * | 10/2010 | Brun | G06F 40/284 |
| | | | 704/9 |
| 7,869,989 B1 | 1/2011 | Harvey et al. | |
| 8,019,590 B1 | 9/2011 | Kinder | |
| 8,019,769 B2 | 9/2011 | Rolle | |
| 8,108,207 B1 | 1/2012 | Harvey et al. | |
| 8,190,423 B2 | 5/2012 | Rehberg | |
| 8,219,566 B2 | 7/2012 | Rolle | |
| 8,417,693 B2 | 4/2013 | Lempel et al. | |
| 8,612,466 B2 | 12/2013 | Kikuchi et al. | |
| 8,661,059 B1 | 2/2014 | Cougias | |
| 9,009,197 B2 | 4/2015 | Cougias | |
| 9,020,808 B2 | 4/2015 | Branton | |
| 9,110,975 B1 | 8/2015 | Diligenti et al. | |
| 9,123,024 B2 | 9/2015 | LeVine et al. | |
| 9,575,954 B2 | 2/2017 | Cougias et al. | |
| 9,715,497 B1 | 7/2017 | Bhadbhade | |
| 9,760,586 B1 | 9/2017 | Cook | |
| 9,798,753 B1 | 10/2017 | Cook | |
| 9,798,767 B1 | 10/2017 | Cook | |
| 9,846,694 B1 | 12/2017 | Cook | |
| 9,923,931 B1 | 3/2018 | Wagster | |
| 9,977,775 B2 | 5/2018 | Cougias et al. | |
| 9,996,608 B2 | 6/2018 | Cougias | |
| 10,198,491 B1 | 2/2019 | Semturs | |
| 10,353,933 B2 | 7/2019 | Cougias | |
| 10,387,575 B1 | 8/2019 | Shen | |
| 10,606,945 B2 | 3/2020 | Cougias et al. | |
| 10,769,379 B1 | 9/2020 | Cougias et al. | |
| 10,824,817 B1 | 11/2020 | Cougias et al. | |
| 10,896,211 B2 | 1/2021 | Cougias | |
| 11,120,227 B1 | 9/2021 | Cougias et al. | |
| 11,216,495 B2 | 1/2022 | Cougias | |
| 2002/0065675 A1 | 5/2002 | Grainger et al. | |
| 2002/0169771 A1 | 11/2002 | Melmon et al. | |
| 2002/0184068 A1 | 12/2002 | Krishnan et al. | |
| 2003/0067498 A1 | 4/2003 | Parisi | |
| 2004/0006466 A1 | 1/2004 | Zhou et al. | |
| 2004/0030540 A1 | 2/2004 | Ovil | |
| 2004/0059932 A1 | 3/2004 | Takeuchi et al. | |
| 2004/0107124 A1 | 6/2004 | Sharpe et al. | |
| 2005/0080776 A1 | 4/2005 | Colledge et al. | |
| 2005/0080780 A1 | 4/2005 | Colledge et al. | |
| 2005/0096914 A1 | 5/2005 | Williamson et al. | |
| 2005/0203924 A1 | 9/2005 | Rosenberg | |
| 2005/0228799 A1 | 10/2005 | Farlow | |
| 2006/0047656 A1 | 3/2006 | Dehlinger | |
| 2006/0149720 A1 | 7/2006 | Dehlinger | |
| 2006/0149800 A1 | 7/2006 | Egnor et al. | |
| 2006/0259475 A1 | 11/2006 | Dehlinger | |
| 2007/0016583 A1 | 1/2007 | Lempel et al. | |
| 2007/0088683 A1 | 4/2007 | Feroglia et al. | |
| 2007/0118515 A1 | 5/2007 | Dehlinger | |
| 2007/0192085 A1 * | 8/2007 | Roulland | G06F 16/3329 |
| | | | 704/9 |
| 2007/0282592 A1 | 12/2007 | Huang et al. | |
| 2007/0283252 A1 | 12/2007 | Stuhec | |
| 2008/0091408 A1 * | 4/2008 | Roulland | G06F 40/211 |
| | | | 704/9 |
| 2008/0208563 A1 | 8/2008 | Sumita | |
| 2008/0262863 A1 | 10/2008 | Stickley et al. | |
| 2009/0024385 A1 | 1/2009 | Hirsch | |
| 2009/0089126 A1 | 4/2009 | Odubiyi | |
| 2009/0089195 A1 | 4/2009 | Salomon et al. | |
| 2009/0112859 A1 | 4/2009 | Dehlinger | |
| 2009/0119141 A1 | 5/2009 | McCalmont et al. | |
| 2009/0187567 A1 | 7/2009 | Rolle | |
| 2009/0265199 A1 | 10/2009 | Moerdler et al. | |
| 2010/0114628 A1 | 5/2010 | Adler | |
| 2010/0145678 A1 * | 6/2010 | Csomai | G06F 40/268 |
| | | | 704/9 |
| 2010/0250313 A1 | 9/2010 | Crocker et al. | |
| 2011/0112973 A1 | 5/2011 | Sanghvi | |
| 2011/0179075 A1 | 7/2011 | Kikuchi et al. | |
| 2011/0208769 A1 | 8/2011 | Kemp | |
| 2011/0225155 A1 * | 9/2011 | Roulland | G06F 16/285 |
| | | | 707/737 |
| 2011/0270603 A1 | 11/2011 | Ovil | |
| 2012/0036157 A1 | 2/2012 | Rolle | |
| 2012/0066135 A1 | 3/2012 | Garst et al. | |
| 2012/0072422 A1 | 3/2012 | Rollins et al. | |
| 2012/0078801 A1 | 3/2012 | Holland et al. | |
| 2012/0116984 A1 | 5/2012 | Hoang | |
| 2012/0197631 A1 | 8/2012 | Ramani et al. | |
| 2013/0091486 A1 | 4/2013 | Gemmell | |
| 2013/0226662 A1 | 8/2013 | LeVine et al. | |
| 2013/0297477 A1 | 11/2013 | Overman | |
| 2013/0346302 A1 | 12/2013 | Purves et al. | |
| 2014/0032209 A1 * | 1/2014 | Etzioni | G06F 40/284 |
| | | | 704/9 |
| 2014/0046892 A1 | 2/2014 | Gopalakrishnan et al. | |
| 2014/0244524 A1 | 8/2014 | Brestoff | |
| 2014/0310249 A1 | 10/2014 | Kowalski | |
| 2015/0066478 A1 | 3/2015 | Onishi | |
| 2015/0220621 A1 | 8/2015 | Cougias | |
| 2016/0306789 A1 | 10/2016 | Cougias et al. | |
| 2016/0350283 A1 | 12/2016 | Carus et al. | |
| 2016/0371618 A1 | 12/2016 | Leidner | |
| 2017/0075877 A1 * | 3/2017 | Lepeltier | G06F 40/205 |
| 2017/0147635 A1 | 5/2017 | McAteer | |
| 2017/0178028 A1 | 6/2017 | Cardonha et al. | |
| 2017/0220536 A1 | 8/2017 | Chiba et al. | |
| 2017/0300472 A1 | 10/2017 | Parikh | |
| 2018/0101779 A1 | 4/2018 | Canim | |
| 2018/0314754 A1 | 11/2018 | Cougias | |
| 2018/0373691 A1 | 12/2018 | Alba et al. | |
| 2019/0080018 A1 | 3/2019 | Pilkington et al. | |
| 2019/0163778 A1 | 5/2019 | Brown | |
| 2019/0188400 A1 | 6/2019 | Vandervort | |
| 2019/0260694 A1 * | 8/2019 | Londhe | G06N 20/00 |
| 2019/0286642 A1 | 9/2019 | Cougias | |
| 2019/0286643 A1 | 9/2019 | Cougias | |
| 2020/0050620 A1 | 2/2020 | Clark et al. | |
| 2020/0176098 A1 | 6/2020 | Lucas | |
| 2020/0327285 A1 * | 10/2020 | Cox | G06F 16/90348 |
| 2021/0004535 A1 | 1/2021 | Cougias et al. | |
| 2021/0149932 A1 | 5/2021 | Cougias | |
| 2021/0365638 A1 | 11/2021 | Cougias et al. | |

OTHER PUBLICATIONS

"CSA Cloud Security Alliance—History," <cloudsecurityalliance.org/history/>, 2010, (2 Pages).
"HITRUST Common Security Framework Matures with Enhancements for 2010," Feb. 1, 2010, 4 pages. <hitrustalliance.net/hitrust-common-security-framework-matures-enhancements-2010/>.
"ISF Information Security Forum," <securityforum.org/about/>, first published 2007, (3 Pages).
Cloud Security Alliance, "Security Guidance for Critical Areas of Focus in Cloud Computing V2.1 ," Dec. 2009, 76 pages.

(56) References Cited

OTHER PUBLICATIONS

Devlin et al., "BERT: Pre-training of Deep Bidirectional Transformers for Language Understanding," Cornell University, 2018, 14 pages.
Final Office Action for U.S. Appl. No. 16/432,737, dated Feb. 11, 2021, 10 pages.
International Preliminary Report on Patentability for related PCT Application No. PCT/US2016/026787, dated Oct. 24, 2017 (10 pages).
International Search Report and Written Opinion for International App. No. PCT/US2013/068341, dated Feb. 26, 2014, 9 pages.
International Search Report and Written Opinion for International Application No. PCT/US2016/026787, dated Jul. 22, 2016, 13 pages.
Lan et al., "ALBERT: A Lite Bert for Self-Supervised Learning of Language Representations," arXiv preprint arXiv:1909.11942, 2019, 17 pages.
Masini, F., "Multi-Word Expressions and Morphology," Oxford Research Encyclopedias, 2019, 30 pages.
Mikolov et al., "Distributed Representations of Words and Phrases and their Compositionality," Advances in neural information processing systems:3111-3119, 2013.
Non Final Office Action for U.S. Appl. No. 13/952,212, dated Oct. 15, 2013, 7 pages.
Non Final Office Action for U.S. Appl. No. 16/432,634, dated Feb. 5, 2021, 7 pages.
Office Action for U.S. Appl. No. 16/459,385, dated Apr. 23, 2021, 17 pages.
Pennington et al., "GloVe: Global Vectors for Word Representation," Proceedings of the 2014 Conference on Empirical Methods in Natural Language Processing (EMNLP): 1532-1543, 2014.
Peters et al., "Deep contextualized word representations," arXiv preprint arXiv:1802.05365v2, 2018, 15 pages.
Proffitt, Tim, "Meeting Compliance Efforts with the Mother of All Control Lists (MOACL)," SANS Institute Information, Security Reading Room, 2010, 56 pages.
Radford et al., "Improving Language Understanding by Generative Pre-Training," 2018 (Retrieved from s3-us-west-2.amazonaws.com on Sep. 14, 2021.).
Ramshaw et al., "Text Chunking Using Transformation-Based Learning," Natural language processing using very large corpora, Springer, 1999, 157-176.
Ratinov et al., "Design Challenges and Misconceptions in Named Entity Recognition," Proceedings of the Thirteenth Conference on Computational Natural Language Learning (CoNLL):147-155, 2009.
Rohanian at al., "Bridging the Gap: Attending to Discontinuity in Identification of Multiword Expressions," Cornell University, 2019, 7 pages.
Schneider et al., "SemEval-2016 Task 10: Detecting Minimal Semantic Units and their Meanings (DiMSUM)," Proceedings of SemEval:546-559, 2016.
U.S. Appl. No. 13/952,212, filed Jul. 26, 2013, Dorian J. Cougias. Note—Cite Granted U.S. Pat. No. 8,661,059—Already added to US citation list.
Vaswani et al., "Attention Is All You Need," 31st Conference on Neural Information Processing Systems, 2017, 11 pages.
Wikipedia, "Frequency (statistics)", 4 pages, downloaded Mar. 11, 2020. (Year: 2020).
Wikipedia, "Word lists by frequency", 10 pages, downloaded Mar. 11, 2020. (Year: 2020).
International Search Report and Written Opinion for International Application No. PCT/US2021/048088, dated Feb. 9, 2022, 13 pages.
Office Action dated Oct. 12, 2021, for U.S. Appl. No. 16/432,634 (17 pages).
Office Action dated Dec. 7, 2021, for U.S. Appl. No. 17/389,959 (33 pages).
Ferrari et al., "Detecting requirements defects with NLP patterns: an industrial experience in the railway domain," Empirical Software Engineering, 2018, vol. 23, pp. 3684-3733.
Škvorc et al., "MICE: Mining Idioms with Contextual Embeddings," Aug. 14, 2020, pp. 1-23.
Gharbieh et al., "Deep Learning Models For Multiword Expression Identification," *Proceedings of the 6th Joint Conference on Lexical and Computational Semantics*, Canada, Aug. 3-4, 2017, pp. 54-64.
Wahl, "The Distributional Learning of Multi-Word Expressions: A Computational Approach," Jun. 2015, pp. 1-190.
Baldwin et al., "Chapter 1—Multiword Expressions", *Handbook of Natural Language Processing*, Second Edition, 2010, pp. 1-40.
Suissas, "Verb Sense Classification," Thesis to obtain the Master of Science Degree in Information Systems and Computer Engineering, Oct. 2014, pp. 1-72.

\* cited by examiner

FIG. 11

Should this MWE be removed from the dictionary?: "university's system and information integrity policy"

- ☐ Yes
- ☐ No

Occurrences in corpus:

| frequency | context |
|---|---|
| 3 | "Evaluate the system and information integrity policy." |
| 1 | "Establish, implement, and maintain a system and information integrity policy." |

AUTOMATICALLY IDENTIFYING MULTI-WORD EXPRESSIONS

CROSS-REFERENCE TO RELATED APPLICATIONS

This Application claims the benefit of U.S. Provisional Application No. 63/073,323, filed Sep. 1, 2020 and entitled "IDENTIFYING MULTI-WORD EXPRESSIONS USING TRANSFORMERS," which is hereby incorporated by reference in its entirety.

This Application claims the benefit of U.S. Provisional Application No. 63/071,180, filed Aug. 27, 2020 and entitled "IDENTIFICATION OF MULTI-WORD EXPRESSIONS USING TRANSFORMERS," which is hereby incorporated by reference in its entirety.

This application is related to the following applications, each of which is hereby incorporated by reference in its entirety: U.S. Provisional Patent Application No. 61/722,759 filed on Nov. 5, 2012; U.S. patent application Ser. No. 13/723,018 filed on Dec. 20, 2012 (now U.S. Pat. No. 9,009,197); U.S. patent application Ser. No. 13/952,212 filed on Jul. 26, 2013 (now U.S. Pat. No. 8,661,059); International Application No. PCT/US2013/068341 filed on Nov. 4, 2013; U.S. patent application Ser. No. 14/685,466 filed on Apr. 13, 2015 (now U.S. Pat. No. 9,996,608); U.S. patent application Ser. No. 15/794,405 filed on Oct. 26, 2017 (now U.S. Pat. No. 10,353,933); U.S. patent application Ser. No. 17/160,175 filed on Jan. 27, 2021; U.S. patent application Ser. No. 16/026,524 filed on Jul. 3, 2018 (now U.S. Pat. No. 10,896,211); U.S. patent application Ser. No. 16/432,634 filed on Jun. 5, 2019; U.S. patent application Ser. No. 16/432,737 filed on Jun. 5, 2019; U.S. Provisional Patent Application No. 62/150,237 filed on Apr. 20, 2015; U.S. patent application Ser. No. 14/963,063 filed on Dec. 8, 2015 (now U.S. Pat. No. 9,575,954); International Application No. PCT/US2016/026787 filed on Apr. 8, 2016; U.S. patent application Ser. No. 15/404,916 filed on Jan. 12, 2017 (now U.S. Pat. No. 9,977,775); U.S. patent application Ser. No. 15/957,764 filed on Apr. 19, 2018 (now U.S. Pat. No. 10,606,945); U.S. patent application Ser. No. 16/459,385 filed on Jul. 1, 2019; U.S. patent application Ser. No. 17/397,693 filed on Aug. 9, 2021; U.S. patent application Ser. No. 16/459,412 filed on Jul. 1, 2019 (now U.S. Pat. No. 10,824,817); U.S. patent application Ser. No. 16/459,429 filed on Jul. 1, 2019 (now U.S. Pat. No. 10,769,379); U.S. patent application Ser. No. 16/932,609 filed on Jul. 17, 2020; U.S. Provisional Patent Application No. 63/223,879 filed on Jul. 20, 2021; and U.S. patent application Ser. No. 17/389,959 filed on Jul. 30, 2021.

In cases where the present patent application conflicts with an application or other document incorporated herein by reference, the present application controls.

BACKGROUND

Various automatic natural language processing and natural language understanding applications process natural language text based upon recognizing noun phrases and verb phrases.

Some noun phrases consist of only a single word, while others are each made up of multiple words. Similarly, some verb phrases are made up of a single word, while others contain multiple words. Multiple-word verb phrases and multiple-word noun phrases are referred to collectively herein as "multi-word expressions" or "MWEs."

Table 1 below contains a number of sample sentences in which noun MWEs are identified using bold formatting, and verb MWEs are identified by italic formatting. These sample sentences are typical of those taken from authority documents processed for compliance purposes.

TABLE 1

1. *Establish, implement, and maintain* a system and information integrity policy.
2. *Refrain from redisclosing or reusing* personal data.
3. *Report* compliance monitoring statistics to the Board of Directors and other critical stakeholders, as necessary.
4. *Segregate* out of scope systems from in scope systems.

BRIEF DESCRIPTION OF THE DRAWINGS

FIG. 11 is a display diagram showing a sample display presented by the facility in some embodiments to obtain input from a human editor about whether to remove an MWE from the dictionary.

DETAILED DESCRIPTION

Figure 1:
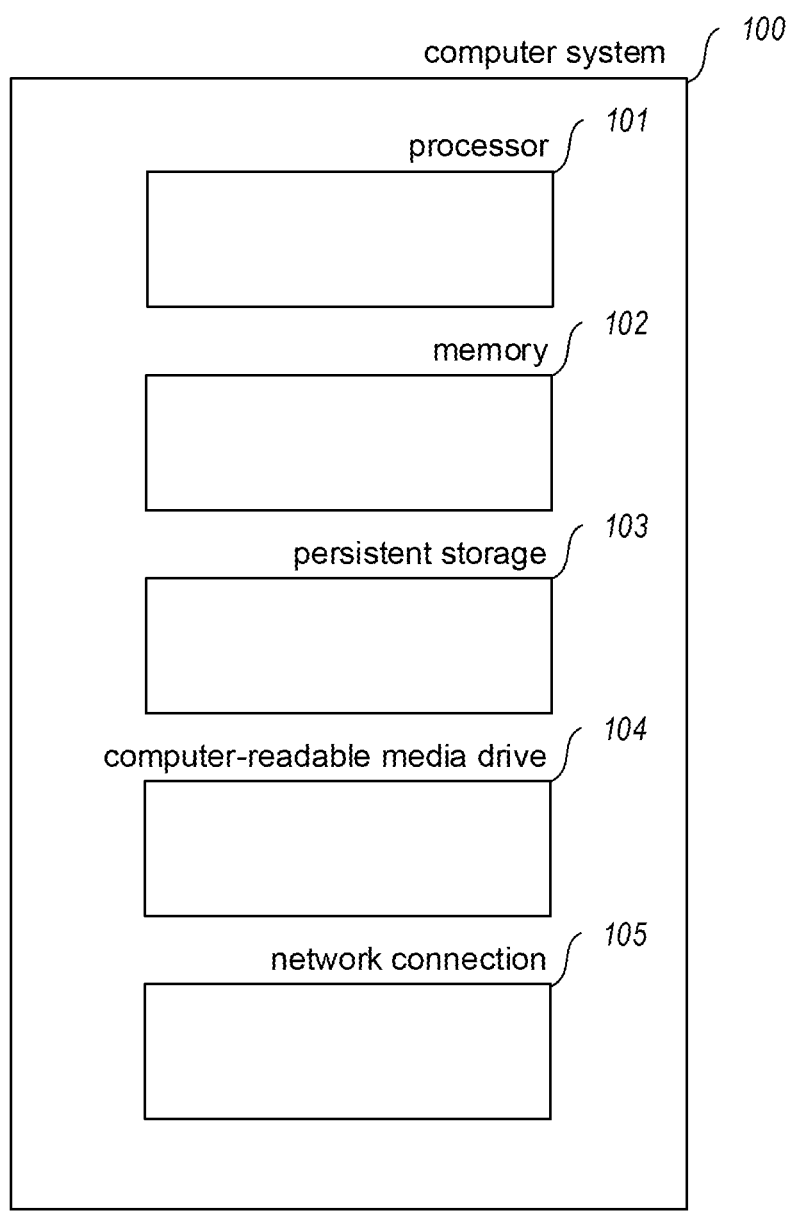
FIG. 1 is a block diagram showing some of the components typically incorporated in at least some of the computer systems and other devices on which the facility operates.

The inventors have recognized that, while conventional dictionaries are reasonably complete in identifying single-word nouns and verbs that can be matched to sentences being analyzed, they include only a very small percentage of MWEs. Additionally, they have recognized that the particular MWEs used varies dramatically across different domains of writing.

In response to recognizing the above disadvantages of using conventional dictionaries as a basis for recognizing noun phrases and verb phrases that include MWEs, the inventors have conceived and reduced to practice a software and/or hardware facility that automatically identifies MWEs in input sentences ("the facility").

In particular, the facility uses two or more constituent models that each employ a different approach to generate analysis results identifying MWEs that occur in an input sentence. The facility then uses constituent model result evaluation module to derive overall MWE identification results from the results produced by the constituent models. In some embodiments, the constituent model result evaluation module is a logical ruleset applied by the facility. In some embodiments, the constituent model result evaluation module is a machine learning model—such as a reinforcement learning model—constructed, trained, and applied by the facility.

In some embodiments, one of the facility's constituent models is a transformer, such as a Bidirectional Encoder Representation from Transformers ("BERT") transformer. In various embodiments, the facility uses the results of empirical testing to (1) select one among multiple transformer types, transformer training sets, and/or transformer configurations for exclusive use by the constituent model, or to (2) weight results produced by two or more different transformer types, transformer training sets, and/or transformer configurations to obtain a weighted aggregation for output by the transformer constituent model.

In some embodiments, one or more of the facility's constituent models implement linguistic analysis algorithms, such as noun chunking algorithms and/or verb chunking algorithms. In various embodiments, the facility uses the results of empirical testing to (1) select one among multiple linguistic analysis algorithms for exclusive use by this constituent model, or to (2) weight results produced by two or more different linguistic analysis algorithms to obtain a weighted aggregation for output by the constituent model.

In some embodiments, one of the facility's constituent models accesses a dynamic dictionary to identify in the input text MWEs that have entries in the dictionary. In some embodiments, the dictionary's MWE entries have been added to it in response to input from a linguist and/or a subject matter expert certifying that they are proper MWEs. In some embodiments, this dictionary matches the longest MWEs contained by both the input text and the dictionary.

In some embodiments, the facility uses a constituent model result evaluation module to arbitrate among different results outputted by the different constituent models recognizing MWEs occurring in particular input text, as described in greater detail below. In some embodiments, the constituent model result evaluation module also specifies whether particular MWEs identified by certain constituent models should be automatically added to the dictionary, or should be queued for review by a linguist and/or subject matter expert for discretionary addition to the dictionary. This latter determination is often referred to herein as "nomination" of the MWEs recommended for addition to the dictionary.

In some embodiments, the facility is used to identify MWEs as part of natural language analysis performed by a compliance tool. Compliance tools facilitate an organization's adherence to rules of various kinds that govern their business, and assessing ("auditing") that adherence. These rules are expressed in authority documents, which can include, for example: statutes, regulations, regulatory directives or guidance, contractual obligations, standards, auditing guidelines, safe harbors, best practice guidelines, vendor documentation, and procedures established by the organization for its own operation. In some cases, a compliance process involves some or all of the following phases: selecting and obtaining copies of a group of authority documents that applies to the organization; identifying the expressions of rules ("citations") that occur in the authority documents; performing natural language understanding analysis of the citations to determine the rules ("mandates") that they express; deduplicating the mandates across the group of authority documents—and within individual authority documents—to obtain "controls" (or "common controls") that each represent a set of mandates that are equivalent, and are each linked to that set of mandates; constructing an audit questionnaire from the controls that efficiently covers compliance with all of the authority documents in the group; and using the established structure of citations, mandates, controls, and audit questions and answers to establish that the answers to audit questions demonstrate compliance with the authority documents in the group. In some cases, documents, citations, mandates, and/or controls are constructed with reference to data objects called "terms" that constitute dictionary entries for words or phrases occurring in those higher-level data objects.

By performing in some or all of the ways described above, the facility identifies a much more complete list of noun phrases and/or verb phrases quickly, using limited computing resources, enabling higher-quality natural language processing results.

Also, the facility improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks or additional instances of the same task. For example, the facility conserves processing and user interface resources that would have been applied to facilitating a person's manual analysis of entire documents to identify the contained MWEs. As a result, cheaper, less powerful devices can be substituted to achieve the same level of performance, or the same devices can be used with excess processing capacity remaining for performing additional desirable tasks.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
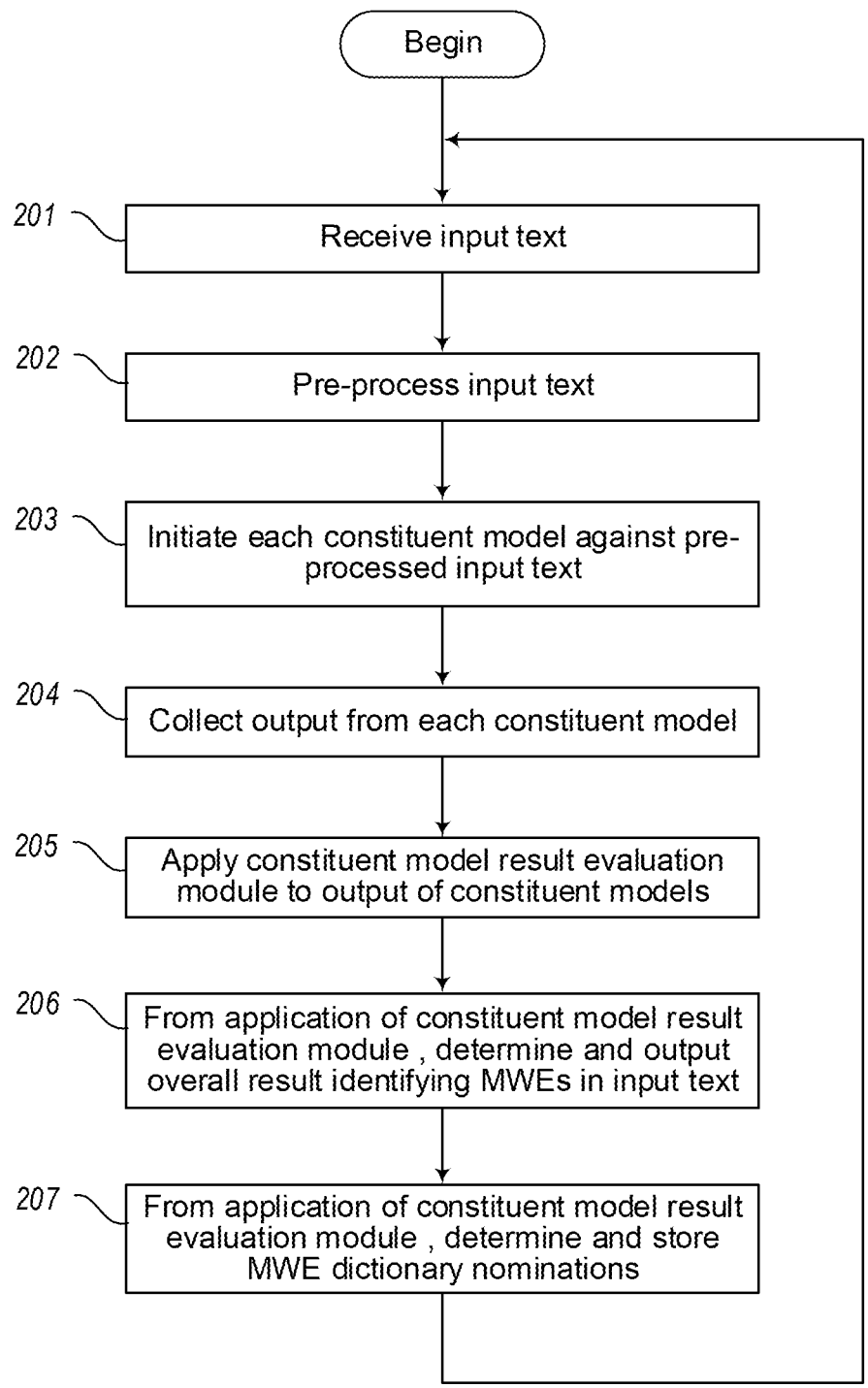
FIG. 2 is a flow diagram showing a process performed by the facility in some embodiments to automatically identify MWEs that occur in input text.

FIG. 2 is a flow diagram showing a process performed by the facility in some embodiments to automatically identify MWEs that occur in input text. In act 201, the facility receives a unit of input text, such as a sentence. In act 202, the facility pre-processes the input text to prepare it for consumption by the constituent models.

Figure 3:
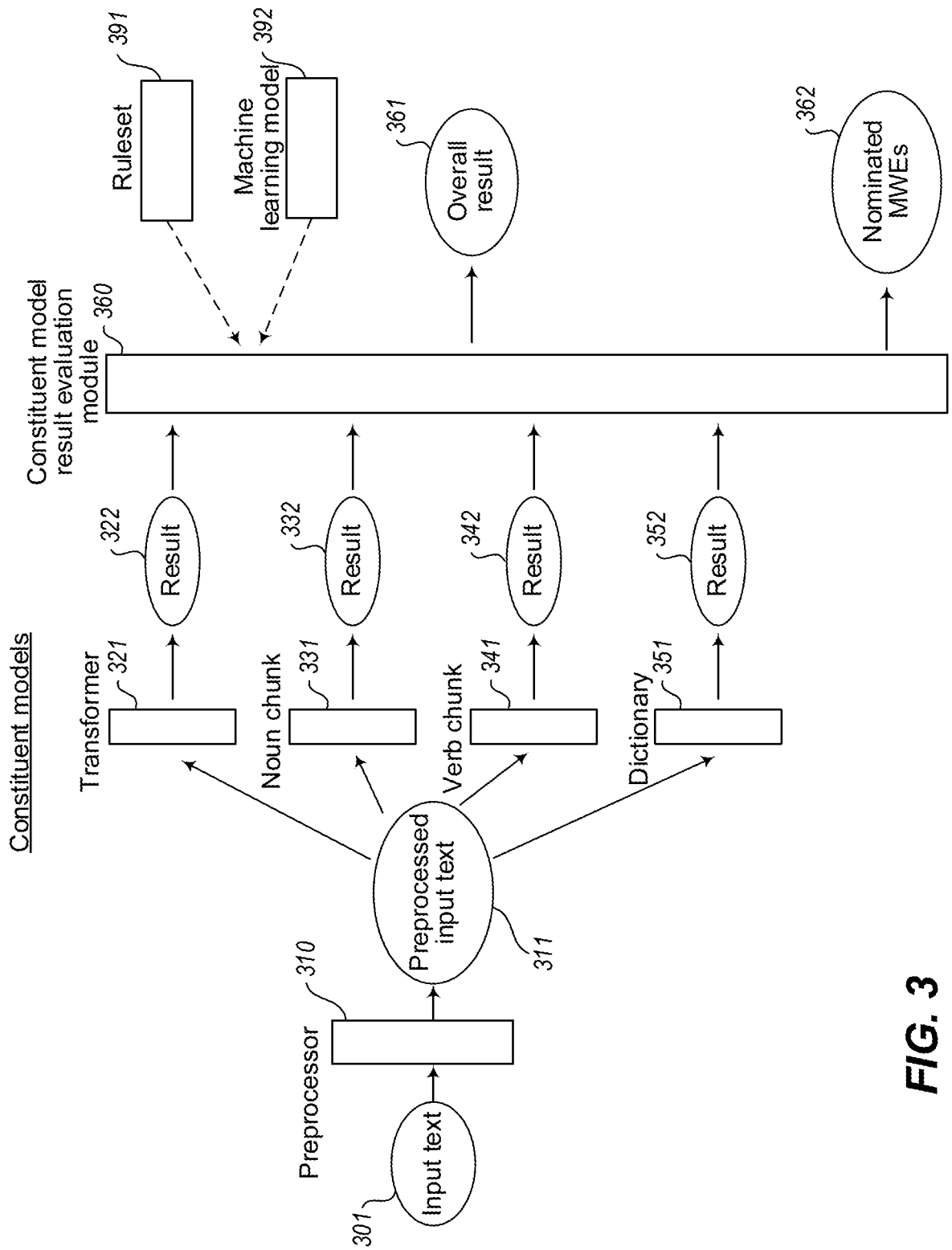
FIG. 3 is a data flow diagram showing aspects of the facility's performance of the process shown in FIG. 2.

FIG. 3 is a data flow diagram showing aspects of the facility's performance of the process shown in FIG. 2. It can be seen that the facility subjects input text 301 to a preprocessor 310 to obtain pre-processed input text 311. Aspects of the preprocessing performed by the facility in some embodiments are described below. In some embodiments, the aspects of the facility's preprocessing are discussed herein as part of an "NLP pipeline" operated by the facility.

In various embodiments, the facility's preprocessing of the input text includes:

1. The facility tokenizes the input text, converting it from original plain text form into word tokens. An example of tokenization is shown below in Table 2 for the third example sentence in Table 1 above.

TABLE 2

| |
|---|
| Report |
| compliance |
| monitoring |
| statistics |
| to |
| the |
| Board |
| of |
| Directors |
| and |
| other |
| critical |
| stakeholders |
| , |
| as |
| necessary |
| . |

2. In subword tokenization, the facility converts word tokens into subword units to increase the amount of information per token while minimizing vocabulary size. For example, in some embodiments, the facility assigns a different token value to each individual character; then defines word fragment tokens identified by their own token numbers by the token numbers of the characters they contain; then defines a word token having its own token number based upon the token numbers of the word fragment tokens that make it up. An example of this based upon the word "faster" is shown below in Table 3.

TABLE 3

| |
|---|
| f (6) a (1) s (19) t (20) e (5) r (18) → fast (19731) er (288) → faster (18277) |

3. In performing sentence splitting, the facility divides raw text that may contain multiple sentences into individual sentences.

4. The facility performs part of speech tagging by assigning a part of speech tag to tokens, such as adjective, adverb, conjunction, noun, verb, article, punctuation, etc. An example of part of speech tagging is shown below in Table 4.

TABLE 4

| |
|---|
| Report (NOUN) compliance (NOUN) monitoring (NOUN) statistics (NOUN) to (ADP) the (DET) Board (NOUN) of (ADP) directors (NOUN) and (CONJ) other (ADJ) critical (ADJ) stakeholders (NOUN) , (PUNCT) as (ADP) necessary (ADJ) . (PUNCT) |

5. The facility performs lemmatization by converting each word token into its lemma, i.e., its base dictionary form. For example, the facility lemmatizes the word "stakeholders" in the example sentence to its singular form "stakeholder".

6. The facility performs named entity recognition by detecting entities—such as countries, organization, people, etc.—numbers, dates, and times.

7. The facility performs dependency analysis by parsing the text and detecting linguistic relationships between the tokens.

Figure 4:
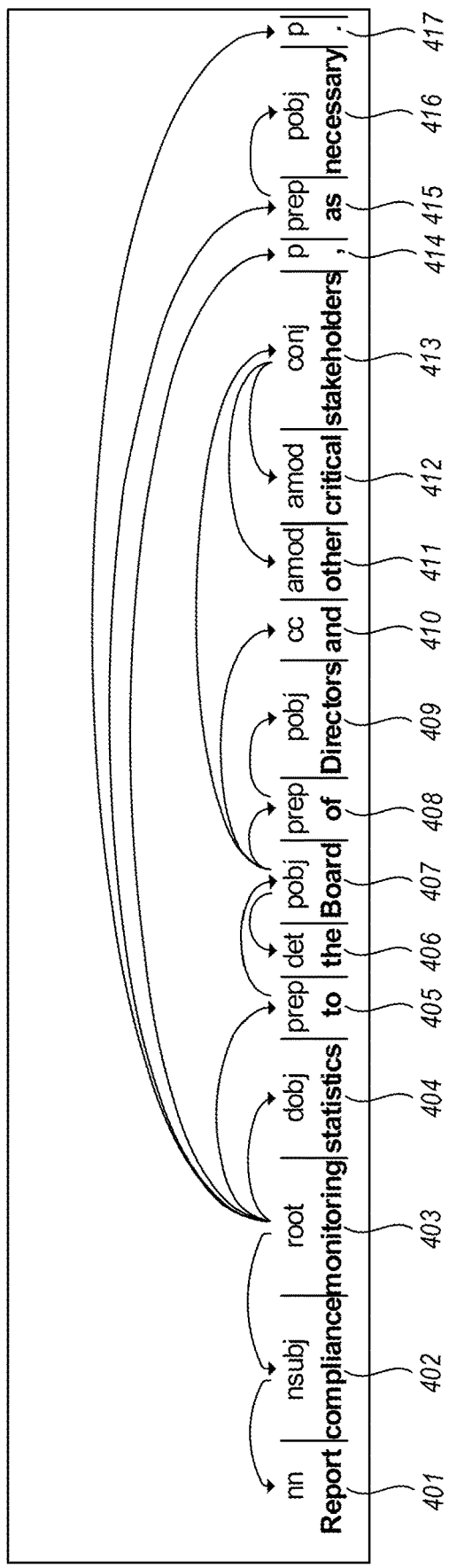
FIG. 4 is a dependency diagram showing dependencies discerned between tokens by the facility in a sample sentence.

FIG. 4 is a dependency diagram showing dependencies discerned between tokens by the facility in a sample sentence. In particular, each directed arc among tokens 401-417 shows a dependency of one token on another. For example, the arc from token 403 to token 402 reflects a dependency of the token "monitoring" on the token "compliance."

Returning to FIG. 2, in act 203, the facility initiates each constituent model against the pre-processed input text obtained in act 202.

Returning to FIG. 3, it can be seen that the following constituent models are initiated by the facility against pre-processed input text 311: a transformer constituent model 321, a noun chunk constituent model 331, a verb chunk constituent model 341, and a dictionary constituent model 351. These constituent models each generate their own result, results 322, 332, 342, and 352, respectively.

Figure 5:
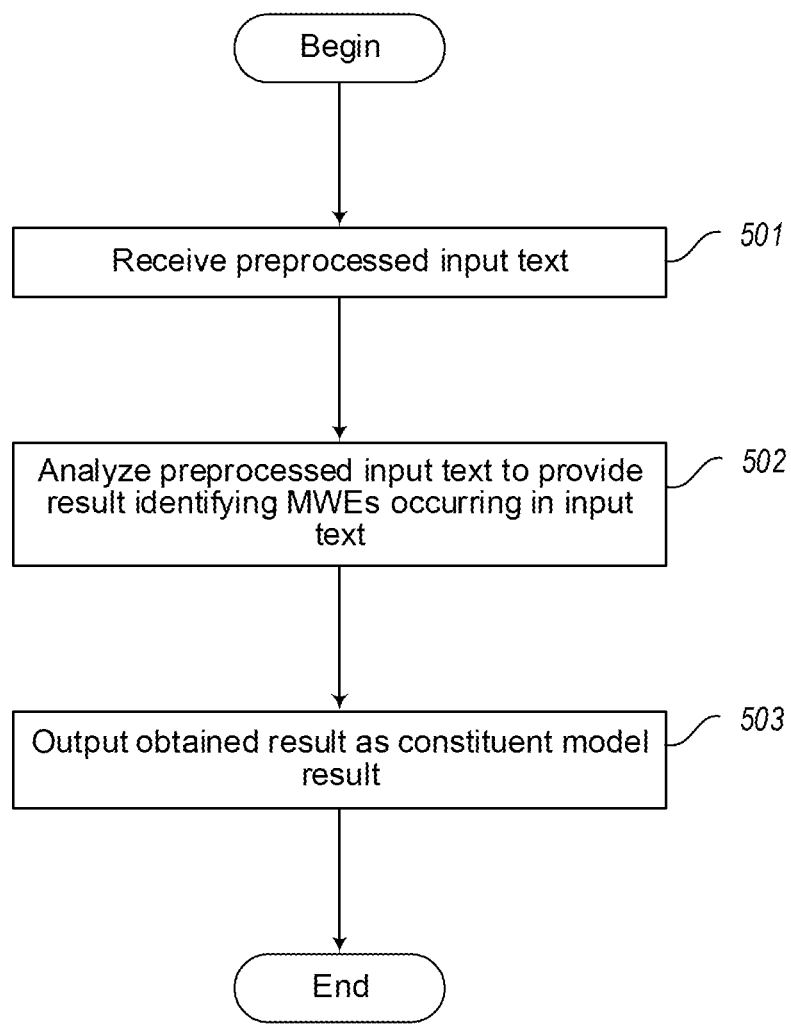
FIG. 5 is a flow diagram showing a process performed by the facility in each constituent model to identify MWEs occurring in the pre-processed input text.

FIG. 5 is a flow diagram showing a process performed by the facility in each constituent model to identify MWEs occurring in the pre-processed input text. In act 501, the facility receives the pre-processed input text. In act 502, the facility analyzes the pre-processed input text received in act 501 to produce a result that identifies MWEs occurring in the input text. In act 503, the facility outputs the obtained result as the constituent model result. After act 503, this process concludes.

Those skilled in the art will appreciate that the acts shown in FIG. 5 and in each of the other flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

The operation of the facility's constituent models is discussed in greater detail below.

In some embodiments, for the transformer constituent model, the facility uses a BERT-Base multilingual case model which has been trained on 104 languages with 12-layer, 768-hidden, 12-heads, and 110M parameters. Additional details about configuring and using BERT are available in Jacob Devlin, Ming-Wei Chang, Kenton Lee, and Kristina Toutanova, 2018, Bert: Pre-training of deep bidirectional transformers for language understanding. *arXiv preprint arXiv:*1810.04805, which is herein incorporated by reference in its entirety. In some embodiments, the facility uses an ALBERT-xxlarge-v1 model with 12 repeating layer, 128 embedding, 4096-hidden, 64-heads, and 223M parameters. Additional details about configuring and using ALBERT are provided by Zhenzhong Lan, Mingda Chen, Sebastian Goodman, Kevin Gimpel, Piyush Sharma, and Radu Soricut, 2019, Albert: A lite bert for self-supervised learning of language representations. *arXiv preprint arXiv:*1909.11942, which is hereby incorporated by reference in entirety. In some embodiments, the BERT model, ALBERT model, or both are trained using a DiMSUM data set. Details about this data set are provided by DiMSUM 2016 Shared Task Data, available at github.com/dimsum16/dimsum-data, which is hereby incorporated by reference in its entirety.

In various embodiments, the facility uses a noun chunk constituent model that uses some or all of the following bases for identifying noun MWEs: NC head count—the nouns in a sentence where the nouns are the root of the sentence; NC all count—all of the tokens with a POS tag NOUN; NC spacy count—all the noun chunks identified by a built-on noun chunk iterater in a Spacy tool; NC textacy count—Spacy noun chunks omitting determiners such as "a" or "the"; and/or NC noadj count—the Spacy noun chunks omitting determiners and adjectives. Details about the Spacy tool are provided by TextCategorizer, available at spacy.io/api/textcategorizer, which is hereby incorporated by reference in its entirety.

In some embodiments, the facility uses a verb chunk constituent model that uses some or all of the following bases for identifying verb MWEs: VC head count—the verbs in a sentence where the verbs are the root of the sentence; VC all count—all the tokens with a POS tag VERB; VC consecutive count—consecutive tokens with a POS tab VERB; VC immhead count—tokens that have dependency labels that are among XCOMP, ACOMP, AUXPASS, AUX, PRT, NEG, CONJ, ROOT and the corresponding POS tag of the head tokens are among VERB, NOUN, or PRONOUN; and/or VC head left right count—head verbs whose children have dependency labels among XCOMP, ACOMP, AUXPASS, AUX, PRT, NEG, CONJ, ROOT— construct the entire phrase from leftmost child to rightmost child.

Figure 6:
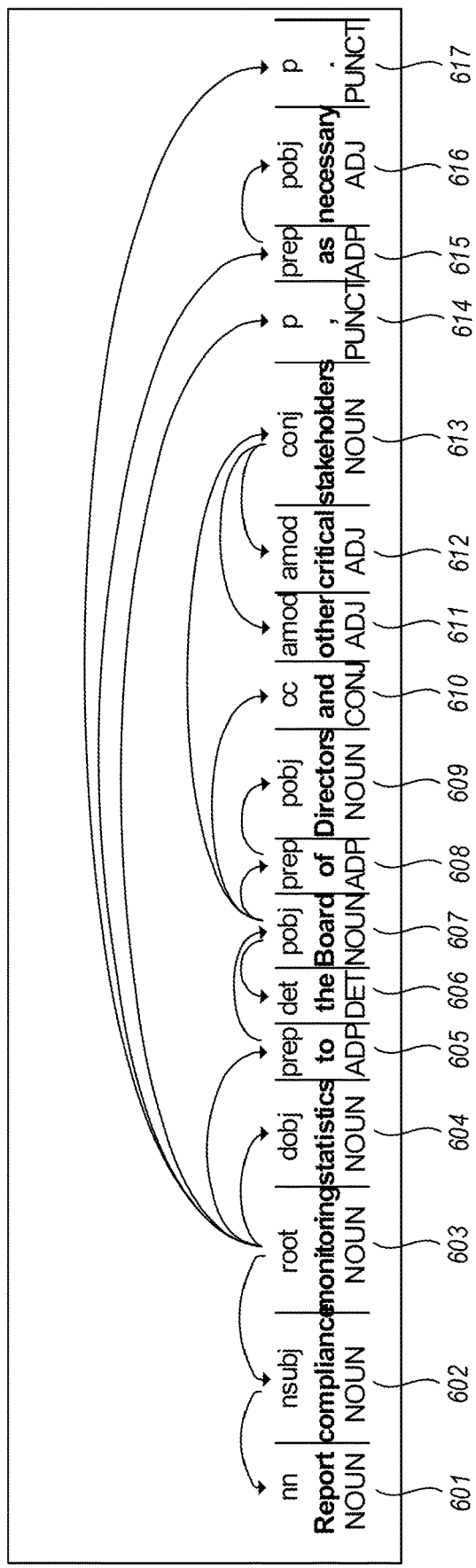
FIG. 6 is a text analysis diagram showing a version of the input text that the facility has processed using the NLP pipeline to attach parts of speech to each token.

In some embodiments, the dictionary constituent model acts on a version of the input text that is pre-processed in the NLP pipeline to include parts of speech. FIG. 6 is a text analysis diagram showing a version of the input text that the facility has processed using the NLP pipeline to attach parts of speech to each token. It can be seen that, for each of tokens 601-617, the facility has attached the part of speech. For example, the facility has attached the part of speech NOUN to the token "report" 601, and the part of speech CONJ to the token "and" 610.

In some embodiments, the dictionary constituent model processes each token identified by the NLP pipeline as a verb by looking that token up in the dictionary and verifying that the dictionary contains an entry for that word having the same part of speech, i.e., verb. The facility then performs word expansion by looking up associated broader terms that include the base verb and words that are adjacent to the left or right in the pre-processed input text until these broadened verbs no longer match input terms or overlap MWEs previously detected in the input text. The facility uses the broadest match in the dictionary. If the word or part of speech does not exist in the dictionary, then the facility skips detecting verb MWEs.

In some embodiments, for tokens that the NLP pipeline identifies as nouns, the facility looks each up in the dictionary and verifies that it contains an entry for that token having the same part of speech, i.e., noun. The facility performs word expansion by looking at the associated broader terms that include the base noun and words adjacent to the left or right until the broadened nouns no longer match the input terms, or overlap MWEs previously detected in the input text. The facility uses the broadest match in the dictionary. If the word or part of speech does exist in the dictionary, then the facility skips detecting noun MWEs.

Figure 7:
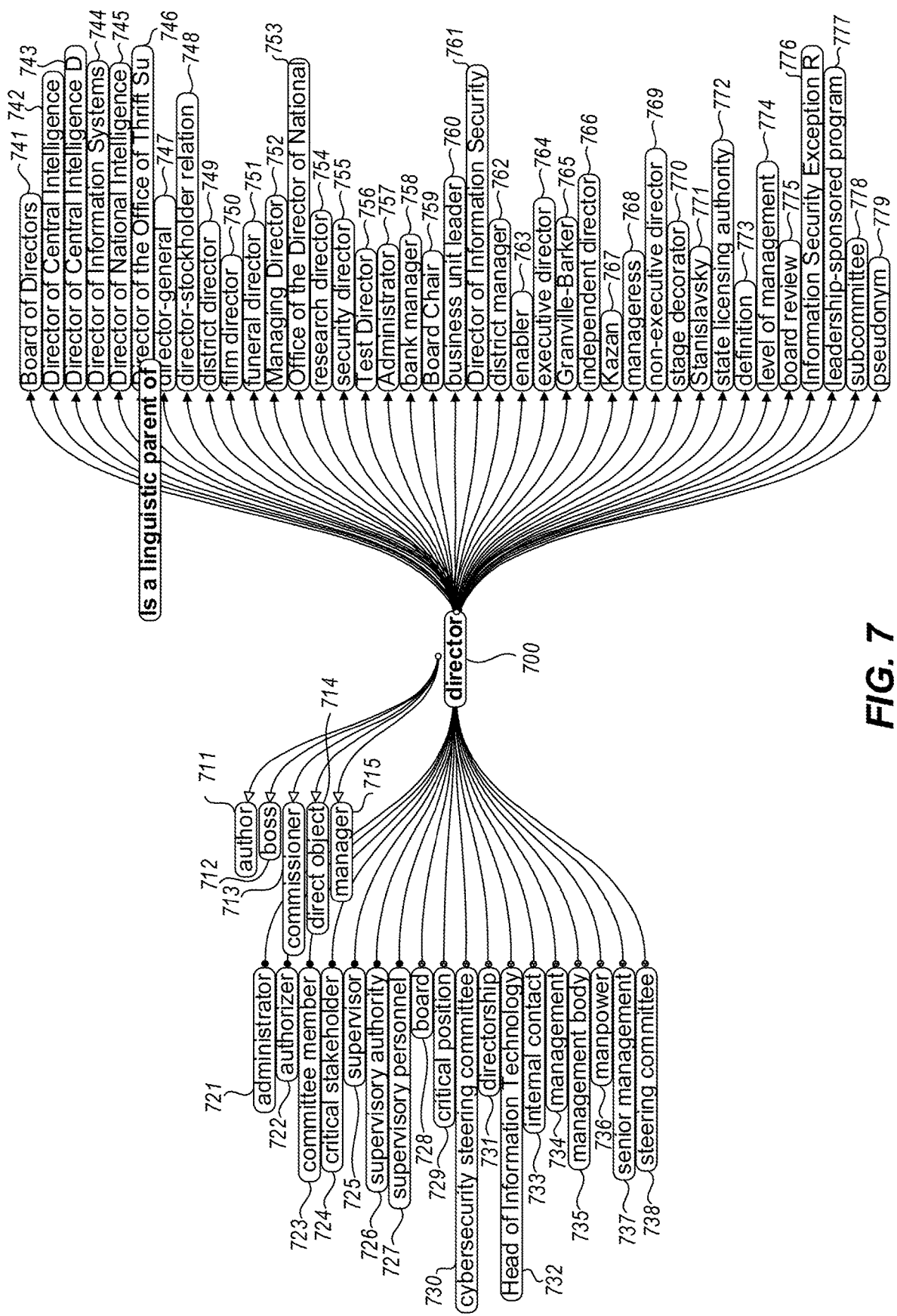
FIG. 7 is a relationship diagram showing ways in which the facility can expand the noun term director based upon relationships in the dictionary.

FIG. 7 is a relationship diagram showing ways in which the facility can expand the noun term "director" based upon relationships in the dictionary. A central node 700 for the noun "director" is related or synonymous with a number of other noun terms in nodes 711-715; it is the linguistic child of noun terms in nodes 721-738; and it is the linguistic parent of noun terms in nodes 741-769.

Returning to FIG. 2, in act 204, the facility collects the output generated by each constituent model, that is, the noun MWEs identified by each constituent model and the verb MWEs identified by each constituent model. Table 5 below identifies, in its second through fifth rows, the result reported by each of the four constituent model models, along with a comparison of that result to a result generated by a human expert shown in the first row of the table as the "gold standard."

TABLE 5

| Approach | IOB tagged sentence with MWE type | Score |
|---|---|---|
| UCF-GRC (Gold standard) | *Report* compliance monitoring statistics to the Board of Directors and other critical stakeholders, as necessary. | Accurate |
| ALBERTxxlarge-v1 | *Report* compliance monitoring statistics to the Board of Directors and other critical stakeholders, as necessary. | Inaccurate |
| nc textacy count | *Report* compliance monitoring statistics to the Board of Directors and other critical stakeholders, as necessary. | Inaccurate |
| vc head count | *Report* compliance monitoring statistics to the Board of Directors and other critical stakeholders, as necessary. | Accurate for verbs only |
| UCF Dictionary | *Report* compliance monitoring statistics to the Board of Directors and other critical stakeholders, as necessary. | Inaccurate |
| UCF (Combined approach, detection techniques) | *Report* compliance monitoring statistics to the Board of Directors and other critical stakeholders, as necessary. | Accurate |

The sixth row of the table contains the ultimate result determined for this input text by the facility, as described below.

In act 205, the facility applies the constituent model result evaluation module to the output of the constituent models collected in act 204. This constituent model result evaluation module 360 is shown FIG. 3.

In some embodiments, the constituent model result evaluation module applied by the facility is the following ruleset:

1. When all three MWE detection methods return the same set of lexical tokens, the facility marks those lexical tokens as MWEs, and suggests no new MWEs to add to the dictionary.

2. When all three MWE detection methods return different sets of lexical tokens, then the dictionary wins—i.e., the result of the dictionary constituent model is adopted as the overall result. If a linguistic algorithm override rule exists to properly classify a commonly misclassified MWE type, then the facility marks MWEs detected by the transformer architecture and linguistic algorithms as MWEs and suggests them as additions to the dictionary. Where such an override does not apply, the facility marks the MWEs identified using the dictionary, and does not suggest any new MWEs.

3. When all three MWE detection methods return different sets of lexical tokens, then the dictionary wins, and the facility marks the MWEs identified by the dictionary, and suggests the MWEs detected by the transformer architecture and linguistic algorithms as additions to the dictionary.

4. When the MWEs returned by the Unified Compliance dictionary were a superset of the MWEs detected by the transformer architecture and linguistic algorithms then the facility suggests those MWEs as additions to the dictionary, and the MWE returned by the dictionary won.

5. When the MWEs detected by the transformer architecture and linguistic algorithms were supersets of the MWEs returned by the dictionary then the facility suggests those MWEs as additions to the dictionary, and the MWEs returned by the algorithms won.

In various embodiments, the facility uses various other rulesets in act 205 to arbitrate among the constituent model outputs and suggest MWEs for addition to the dictionary.

In some embodiments, the constituent model result evaluation module applied by the facility in act 205 is a machine learning model. The facility's construction and application of this machine learning model are discussed in greater detail below in connection with FIGS. 8-12.

In act 206, from the application of the constituent model result evaluation modulein act 205, the facility determines and outputs an overall result identifying the MWEs in the input text and specifying for each whether it is a noun MWE or a verb MWE. This overall result 361 is shown in FIG. 3. In act 207, from the application of the constituent model result evaluation modulein act 205, the facility determines and stores MWE dictionary nominations. These nominated MWEs 362 are shown in FIG. 3. In some embodiments, the facility automatically adds nominated MWEs to the dictionary. In some embodiments, the facility provides a user interface in which human editors, such as linguists and/or domain experts review MWEs to determine whether each should be added to the dictionary.

After act 207, the facility continues in act 201 to receive the next unit of input text.

Figure 8:
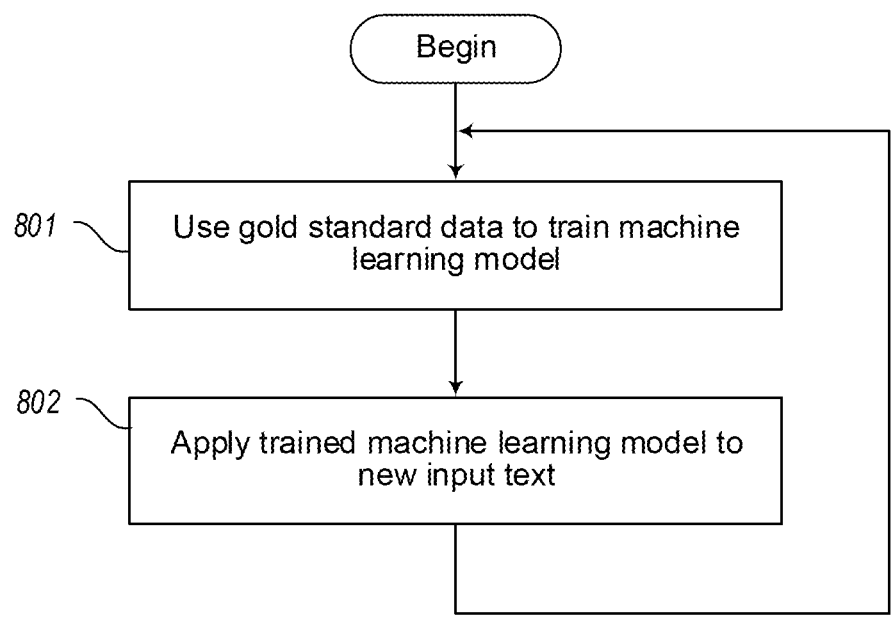
FIG. 8 is a flow diagram showing a process performed by the facility in some embodiments to build a machine learning model to function as its constituent model result evaluation module.

FIG. 8 is a flow diagram showing a process performed by the facility in some embodiments to build a machine learning model to function as its constituent model result evaluation module. In some embodiments, the machine learning model is a reinforcement machine learning model, such as one implemented using, the Gym reinforcement learning toolkit from OpenAI, described at gym.openai.com. In act 801, the facility uses gold standard data to train the machine learning model.

Figure 9:
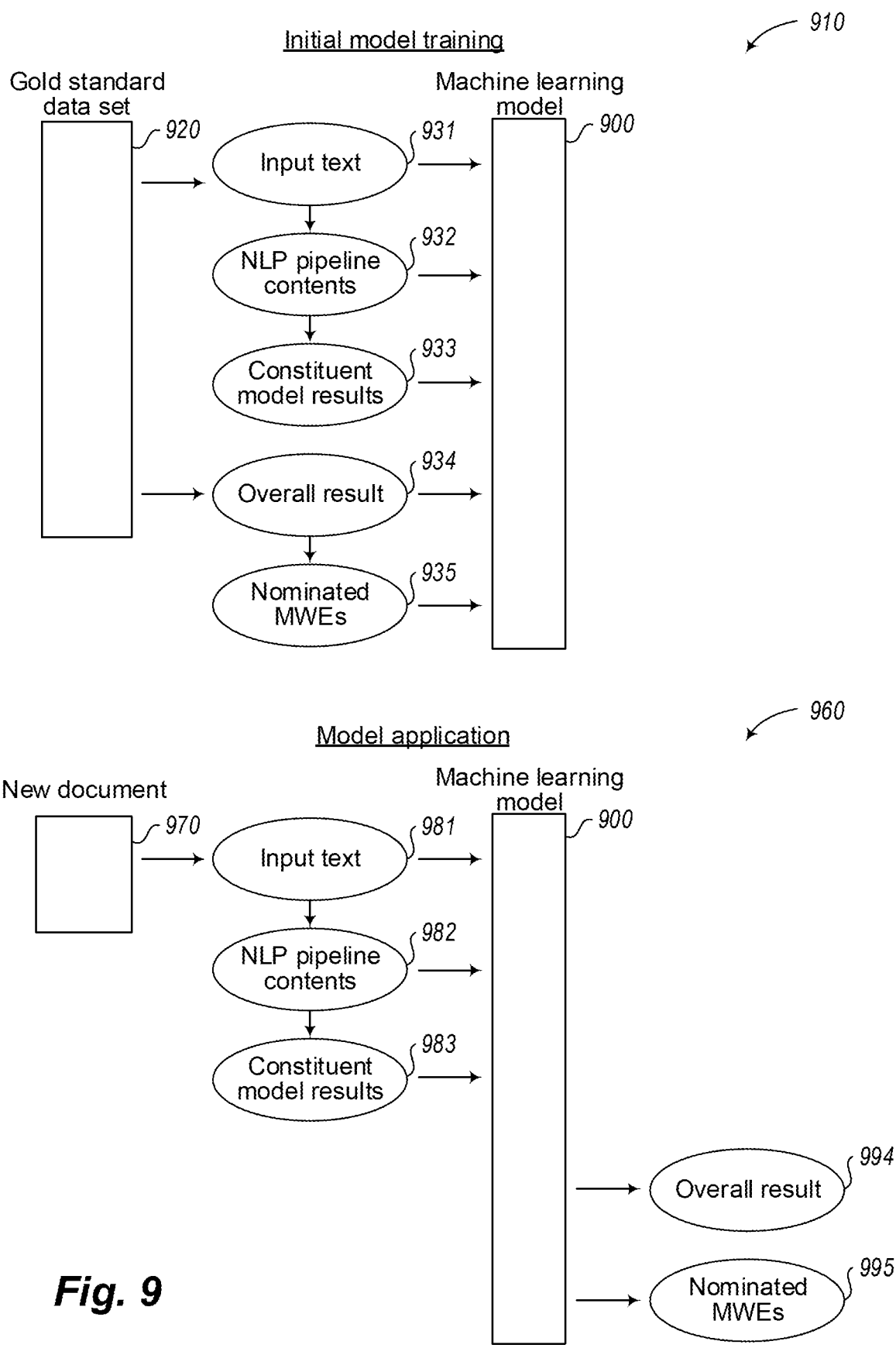
FIG. 9 is a model diagram showing the facility's initial training and application of the machine learning model.

FIG. 9 is a model diagram showing the facility's initial training and application of the machine learning model. In initial training phase 910, the facility trains the machine learning model 900 data using contents of a gold standard data set 920. In particular, the gold standard data set contains a large number of input text sentences that have been tagged by a human expert to identify the MWEs contained by the sentence. For each sentence, the facility provides a training observation to the model made up of independent variable values independent variable values. First, the facility provides the text 931 of the sentence to the model as an independent variable value. Further, the facility performs NLP preprocessing as described above to obtain NLP pipeline contents 932, which it also provides to the model as an independent variable value. The facility also applies the constituent models to the input text and NLP pipeline contents in order to generate a result for the input text 933 for each constituent model; the facility provides these constituent model results to the model as independent variable values. The facility uses the tagging in the gold standard data set to provide an overall result 934 for the sentence the model as a dependent variable. By comparing the MWEs identified by the overall result each to the dictionary, the facility identifies those MWEs identified by the overall result for which the dictionary does not contain an entry; the facility provides these MWEs as nominated MWEs to the model as a dependent variable.

In some embodiments, training a model involves evaluating the following three reward functions for each of the MWEs identified by each of the constituent models. A first reward function is based on whether the MWE identified by the constituent model matches an MWE identified in the overall result—that is, the tagging of the input sentence in the gold standard dataset. A second reward function is based on whether the MWE identified by the constituent model matches the MWE type—noun or verb—identified for this MWE in the overall result. A third reward function is based on whether the constituent model identified all of the MWEs identified in the overall result. In some embodiments, the facility provides an identifier for each MWE identified in any of the constituent model results, so that in its training the model can associate each set of reward function values with the identity of the MWE that it corresponds to. In some embodiments, these identifiers are word vectors, such as those described in Vectors, available at spacy.io/api/vectors, which is hereby incorporated by reference in its entirety. In some cases, the use of word vectors as MWE identifiers allows the model to assess the level of similarity between pairs of MWEs as a basis for treating similar MWEs similarly.

Through this training process, the facility establishes a state of the machine learning model that enables it to predict dependent variable values based upon independent variable values, as discussed below.

Returning to FIG. 8, after act 801, in act 802, the facility applies the machine learning model trained in act 801 to new instances of input text, such as sentences that occur in a new document, in which MWEs are to be identified. In act 802, the facility is applying the machine learning model in place of the rule set as its constituent model result evaluation module. After act 802, the facility continues in act 802 in order to apply the model to the next input text sentence.

Returning to FIG. 9, in model application phase 960, the facility retrieves input text 981 from a new document 970, and submits it to the model as an independent variable value. The facility performs NLP preprocessing on the input text to obtain NLP pipeline contents 982, which it submits to the model as an independent variable value. The facility applies the constituent models to the input text and NLP pipeline contents to obtain constituent model results 983, which it submits to the model as an independent variable value. Based upon the submitted independent variable values, the model outputs as a dependent variable value an overall result 994 for the input text that identifies the MWEs that occur in the input text, and, for each, whether it is a noun MWE or verb MWE. The model also outputs as a dependent variable value and identification of nominated MWEs, each of which is identified in at least one constituent model result and not in the dictionary.

Figure 10:
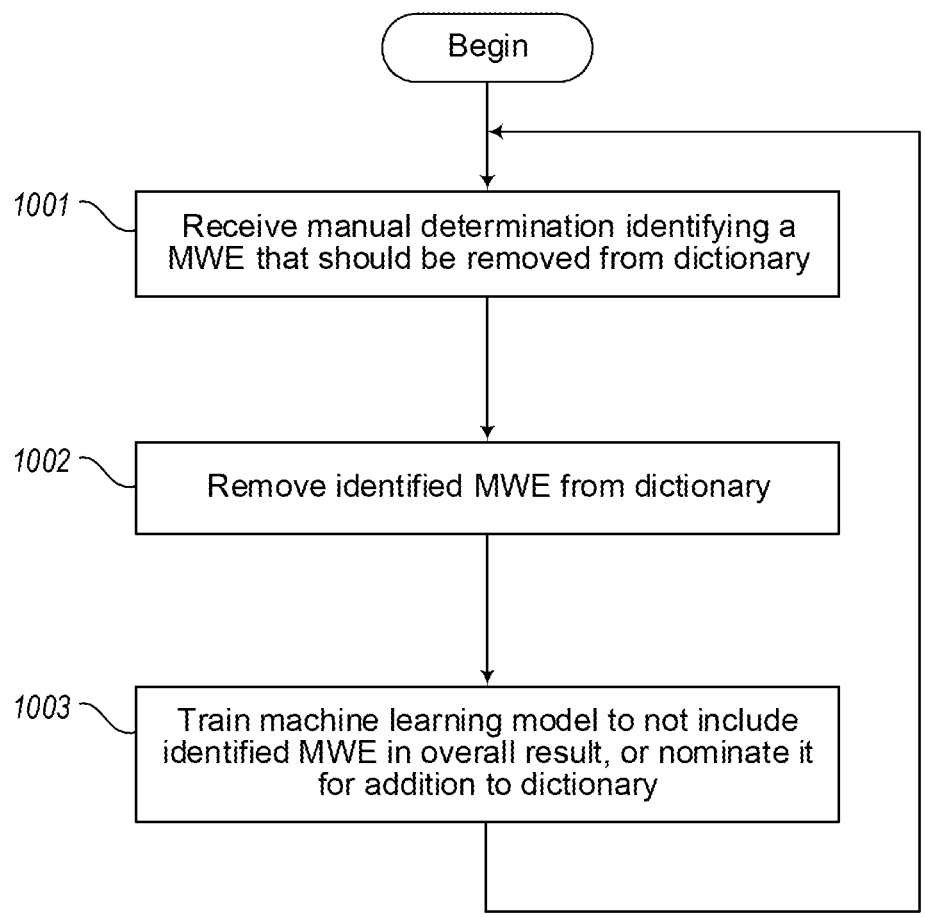
FIG. 10 is a flow diagram showing a process performed by the facility in some embodiments to perform supplemental training for the machine learning model.

FIG. 10 is a flow diagram showing a process performed by the facility in some embodiments to perform supplemental training for the machine learning model. In act 901, the facility receives a manual determination identifying a MWE that should be removed from the dictionary. In various embodiments, this manual determination is generated and received in various ways, such as in connection with a systematic or anecdotal review of MWEs in the dictionary, particularly ones that have been added in response to their nomination by the facility; in connection with a systematic or anecdotal review of new input text sentences that have been tagged as including the MWE; etc.

FIG. 11 is a display diagram showing a sample display presented by the facility in some embodiments to obtain input from a human editor about whether to remove an MWE from the dictionary. The display 800 shows a copy 801 of a MWE—such as an MWE that has been added to the dictionary based on its nomination by the facility—as well as a prompt to select either a Yes control 811 to delete the MWE from the dictionary or a No control 812 to omit to delete the MWE from the dictionary. The facility also presents information 820 about the occurrences of the MWE in a corpus of documents to which the dictionary relates. This information includes sample sentences 821 and 831 that occur in documents of the corpus, as well as corresponding frequency counts 822 and 832 indicating the number of times each of the sentences containing the MWE occur in documents of the corpus. In some embodiments, when the user activates the Yes control or the No control, the facility updates the display to show the another MWE.

While FIG. 11 shows a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Returning to FIG. 10, in act 1002, the facility removes the MWE identified in act 1001 from the dictionary. In act 1003, the facility trains the machine learning model to not include the MWE identified in act 1001 in any overall results predicted by the model, and to not nominate this MWE for addition to the dictionary. After act 1003, the facility continues in act 1001 to receive the next manual determination.

Figure 12:
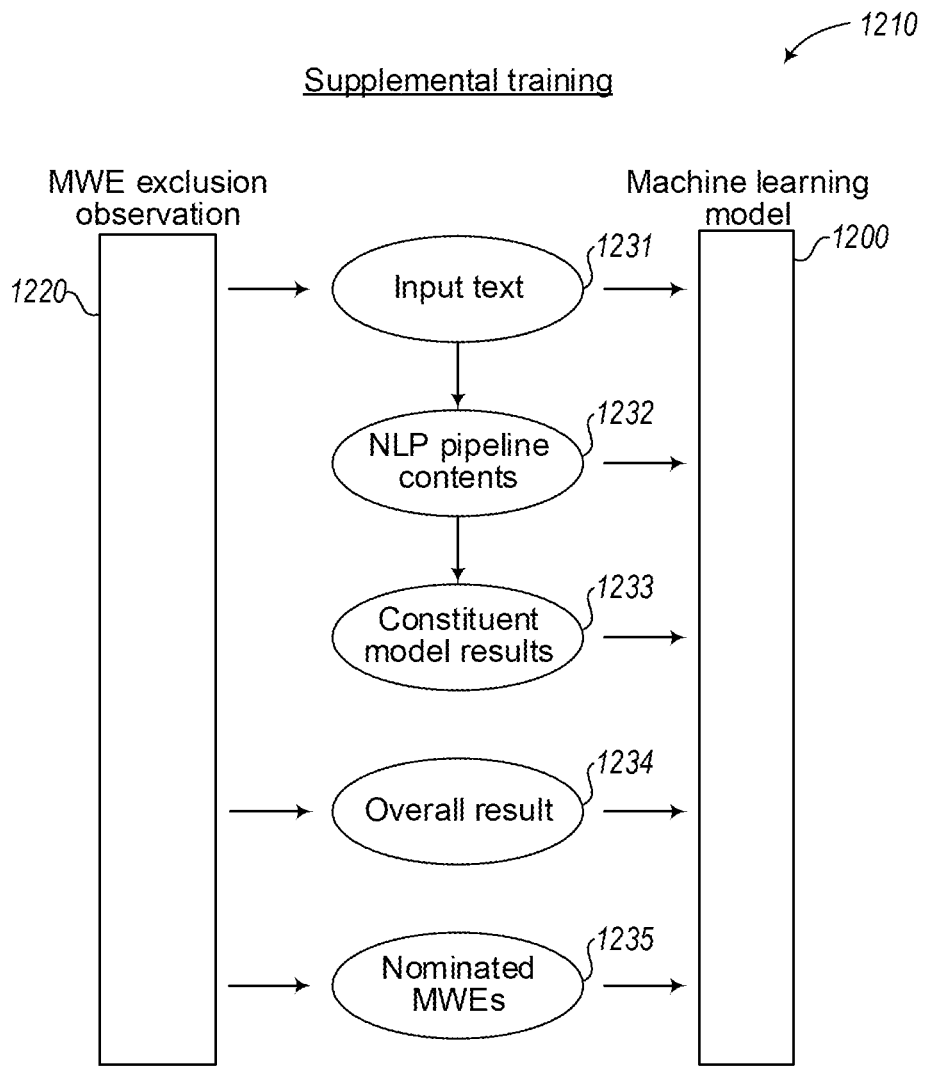
FIG. 12 is a model diagram showing the facility's supplemental training of the machine learning model.

FIG. 12 is a model diagram showing the facility's supplemental training of the machine learning model. As part of the supplemental training, based on the manual determination received in act 1001, the facility constructs one or more MWE exclusion observations 1220. In some embodiments, the facility constructs an MWE exclusion observation for each input text sentence in which the MWE identified by the manual determination occurs. In some embodiments, the facility constructs an MWE exclusion observation for each of a proper subset of input text sentences in which the MWE identified by the manual determination occurs. For each MWE exclusion observation, the facility proceeds as follows. The facility provides the observation's input text 1231 to the model as an independent variable value. The facility performs NLP preprocessing to generate NLP pipeline contents 1232 from the input text, which the facility provides to the machine learning model as an independent variable value. The facility applies the constituent models to the input text and NLP pipeline contents to obtain constituent model results, which it provides to the model as independent variable values. The facility provides to the machine learning model as a dependent variable value an overall result 1234 from the MWE exclusion observation from which the facility has removed the identified MWE. Similarly, the facility provides to the machine learning model as a dependent variable value nominated MWEs 1235 from the MWE exclusion observation from which the facility has removed the identified MWE. By submitting these MWE exclusion training observations to the model, the facility enables the model to adjust its state in a way that makes it less likely that the model will include the MWE in the future in its predictions about overall result or nominated MWEs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:
    receiving a natural language sentence;
    applying to the received sentence a bidirectional encoder representation from transformers to obtain a first multi-word expression recognition result for the received sentence;
    applying to the received sentence a linguistic noun-chunking algorithm to obtain a second multi-word expression recognition result for the received sentence;
    applying to the received sentence a linguistic verb-chunking algorithm to obtain a third multi-word expression recognition result for the received sentence;
    applying to the received sentence a multi-word expression dictionary to obtain a fourth multi-word expression recognition result for the received sentence; and
    applying a constituent result evaluation module to select among the first, second, third, and fourth recognition results.

2. The method of claim 1, further comprising storing the selected recognition result.

3. The method of claim 1, wherein the constituent result evaluation module is a logical ruleset.

4. The method of claim 3 wherein the applied ruleset establishes a precedence among the first, second, third, and fourth recognition results.

5. The method of claim 1, wherein the constituent result evaluation module is machine learning model.

6. The method of claim 5, further comprising:
    causing the added multi-word expression to be displayed;
    receiving user input specifying whether the added multi-word expression is to be added to the multi-word expression dictionary; and
    where the received user input specifies that the added multi-word expression is to be added to the multi-word expression dictionary, creating an entry in the multi-word expression dictionary for the added multi-word expression.

7. The method of claim 1, further comprising, if a multi-word expression recognition result for the received sentence is selected that recognizes in the received sentence a multi-word expression not contained by the multi-word expression dictionary, creating an entry in the multi-word expression dictionary for the multi-word expression recognized by the selected multi-word expression recognition result.

8. The method of claim 7, further comprising:
causing to be displayed with the added multi-word expression one or more sentences occurring in documents contained by a corpus to which the multi-word expression dictionary corresponds.

9. The method of claim 1, further comprising, in response to determining that a multi-word expression recognition result for the received sentence is selected that recognizes in the received sentence a multi-word expression not contained by the multi-word expression dictionary, adding the multi-word expression recognized by the selected multi-word expression recognition result to a nomination queue for the multi-word expression dictionary.

10. A method in a computing system to establish a trained machine learning model, the method comprising:
accessing a plurality of training example each comprising:
a sentence;
information identifying one or more multi-word expressions occurring in the sentence; and
for each multi-word expression identified as occurring in the sentence, an indication of whether the multi-word expression is a noun multi-word expression or a verb multi-word expression;
for each of the plurality of training examples:
subjecting the training example's sentence to natural language preprocessing to obtain natural language preprocessing results;
for each of a plurality of constituent models, invoking the constituent model against the training example's sentence and natural language preprocessing results to obtain a constituent model result for the training example's sentence that identifies one or more portions of the training example's sentence each as a multi-word expression and specifies whether each multi-word expression is a noun multi-word expression or a verb multi-word expression;
constructing a training observation corresponding to the training example that comprises:
independent variable values comprising:
the training example's sentence;
the natural language preprocessing results for the training example's sentence; and
the constituent model result obtained for each of the plurality of constituent models; and
dependent variable values comprising:
the training example's information identifying one or more multi-word phrases occurring in the sentence; and
the training example's indications, for each multi-word phrase identified as occurring in the sentence, of whether the multi-word phrase is a noun multi-word expression or a verb multi-word expression; and
using the constructed training observation to train the machine learning model to predict dependent variable values based on independent variable values.

11. The method of claim 10, further comprising persistently storing the trained machine learning model.

12. The method of claim 10, further comprising, for a distinguished training example, selecting at least one portion of the training example's sentence identified as a multi-word expression in a constituent model result, none of the selected portions having entries in a dictionary,
and wherein the dependent variable values in the training observation constructed for the distinguished training example further comprise information recommending establishing entries in the dictionary for the selected portions.

13. The method of claim 10 wherein the training for each training observation comprises:
for each of the plurality of constituent models:
for each of the portions of the training example's sentence identified as a multi-word expression by the constituent model result obtained for the constituent model:
evaluating a first reward function based on whether the identified portion matches a multi-word expression identified by the training example;
evaluating a second reward function based on whether the specification by the constituent model's constituent model result of whether the identified portion is a noun multi-word expression or a verb multi-word expression matches the training example's indication of whether the multi-word expression is a noun multi-word expression or a verb multi-word expression; and
evaluating a third reward function based on whether the constituent model result identified all of the multi-word expressions identified by the training example.

14. The method of claim 10, further comprising:
receiving a distinguished sentence not among the plurality of training examples;
subjecting the distinguished sentence to natural language preprocessing to obtain natural language preprocessing results for the distinguished sentence;
for each of the plurality of constituent models, invoking the constituent model against the distinguished sentence and the natural language preprocessing results for the distinguished sentence to obtain a constituent model result for the distinguished sentence that identifies one or more portions of the distinguished sentence each as a multi-word expression and specifies whether each multi-word expression is a noun multi-word expression or a verb multi-word expression; and
applying the trained machine learning model to the distinguished sentence, the natural language preprocessing results for the distinguished sentence, and the constituent model results to obtain a prediction identifying one or more multi-word expressions occurring in the distinguished sentence, and, for each multi-word expression identified as occurring in the sentence, an indication of whether the multi-word expression is a noun multi-word expression or a verb multi-word expression.

15. The method of claim 14, further comprising:
receiving an indication that a specified multi-word expression identified by the obtained prediction in the distinguished sentence is an invalid multi-word expression;
in response to receiving the indication:
constructing an exclusion training observation for the distinguished sentence that comprises:
independent variable values comprising:
the distinguished sentence;
the natural language preprocessing results for the distinguished sentence; and
the constituent model result obtained for the distinguished sentence by each of the plurality of constituent models; and
dependent variable values comprising:
the training example's information identifying one or more multi-word phrases occurring in the sentence from which the specified multi-word expression is excluded; and the training example's indications, for each multi-word phrase identified as occurring in the sentence, of whether the multi-word phrase is a noun multi-word expression or a verb multi-word expression; and using the constructed training observation to train the machine learning model to predict dependent variable values based on independent variable values.

16. One or more instances of computer-readable media collectively having contents configured to cause a computing system to perform a method, none of the instances of computer-readable media constituting a transitory signal per se, the method comprising:

receiving a sentence;

subjecting the received sentence to natural language preprocessing to obtain natural language preprocessing results for the received sentence;

for each of a plurality of constituent models, invoking the constituent model against the received sentence and the natural language preprocessing results for the received sentence to obtain a constituent model result for the received sentence that identifies one or more portions of the received sentence each as a multi-word expression and specifies whether each multi-word expression is a noun multi-word expression or a verb multi-word expression; and applying a trained machine learning model to the received sentence, the natural language preprocessing results for the received sentence, and the constituent model results to obtain a prediction identifying one or more multi-word expressions occurring in the received sentence, and, for each multi-word expression identified as occurring in the sentence, an indication of whether the multi-word expression is a noun multi-word expression or a verb multi-word expression.

17. The one or more instances of computer-readable media of claim 16, wherein the prediction obtained by the applying further identifies at least one portion of the received sentence identified by a constituent model as recommended for addition to a dictionary.

18. One or more instances of computer-readable media collectively storing a machine learning model data structure, none of the instances of computer-readable media constituting a transitory signal per se, the data structure comprising:

trained state information established by model training that enables to predict, based upon one or more independent variables comprising an input segment of natural language text, one or more dependent variables comprising a set of one or more contiguous multi-word expressions occurring in the input segment.

19. The one or more instances of computer-readable media of claim 18 wherein the one or more independent variables further comprise results of natural language processing operations performed on the input segment.

20. The one or more instances of computer-readable media of claim 18 wherein the one or more independent variables further comprise, for each of a plurality of constituent models, results of applying the constituent model to the input segment, the results indicating candidate multi-word expressions identified in the input segment by the constituent model.

21. The one or more instances of computer-readable media of claim 18 wherein the one or more dependent variables further comprise a set of one or more contiguous subsegment of the input segment that are recommended for addition to a dictionary.

22. The one or more instances of computer-readable media of claim 18 when the machine learning model is a reinforcement learning model.

* * * * *

UNITED STATES PATENT AND TRADEMARK OFFICE
CERTIFICATE OF CORRECTION

Page 1 of 1

PATENT NO. : 11,386,270 B2
APPLICATION NO. : 17/460054
DATED : July 12, 2022
INVENTOR(S) : Dorian J. Cougias et al.

It is certified that error appears in the above-identified patent and that said Letters Patent is hereby corrected as shown below:

In the Claims

Column 16, Claim 18, Line 11:
"enables to predict, based upon"
Should read:
--enables prediction, based upon--.

Column 16, Claim 18, Line 13:
"natural language text, one or more"
Should read:
--natural language text, of one or more--.

Signed and Sealed this
Twenty-first Day of May, 2024

Katherine Kelly Vidal
*Director of the United States Patent and Trademark Office*